United States Patent [19]

Hansen et al.

[11] Patent Number: 5,103,932
[45] Date of Patent: Apr. 14, 1992

[54] SECURITY SYSTEM FOR AN ENVIRONMENT

[75] Inventors: Niels K. Hansen, Northam; John D. Charters, Midland, both of Australia

[73] Assignee: Myers Holdings Pty. Ltd., Applecross, Australia

[21] Appl. No.: 555,390

[22] PCT Filed: Feb. 16, 1989

[86] PCT No.: PCT/AU89/00065
§ 371 Date: Aug. 3, 1990
§ 102(e) Date: Aug. 3, 1990

[87] PCT Pub. No.: WO89/07814
PCT Pub. Date: Aug. 24, 1989

[30] Foreign Application Priority Data

Feb. 16, 1988 [AU] Australia ................. PI6825

[51] Int. Cl.⁵ ............... B60R 25/04; G08B 29/00
[52] U.S. Cl. ................... 180/287; 307/10.2; 340/426
[58] Field of Search ............ 180/287; 307/10.2; 340/64

[56] References Cited

U.S. PATENT DOCUMENTS

| 4,673,914 | 6/1987 | Lee | 180/287 |
|---|---|---|---|
| 4,682,062 | 7/1987 | Weinberger | 180/287 |
| 4,690,240 | 9/1987 | Russo | 180/287 |
| 4,745,897 | 5/1988 | Teseda | 180/287 |
| 4,888,575 | 12/1989 | De Vauix | 180/287 |
| 4,901,054 | 2/1990 | Waterman | 180/287 |

Primary Examiner—Kenneth R. Rice
Attorney, Agent, or Firm—Harness, Dickey & Pierce

[57] ABSTRACT

The present invention provides a security system for an environment such as a building, safe or motor vehicle. The security system can be disarmed only by using a voltage level which exceeds the voltage level normally available in the environment. The security system comprises means for disarming the system, such means being responsive only to a voltage level exceeding the voltage level normally available in the environment. The security system further comprises means, including a capacitor, for generating a disarming voltage level which exceeds the first voltage level and to which the disarming means is responsive so as to disarm the system.

9 Claims, 6 Drawing Sheets

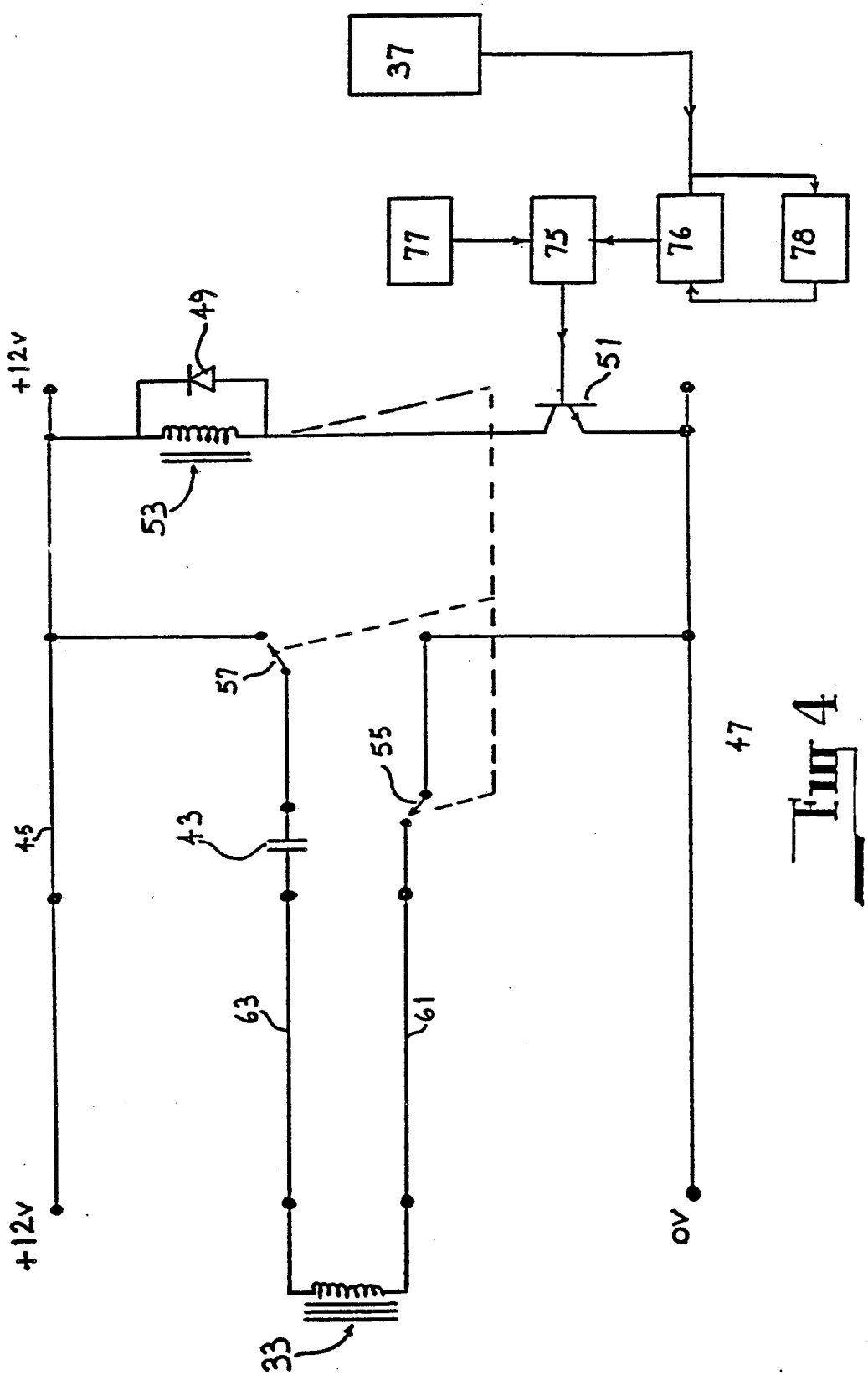

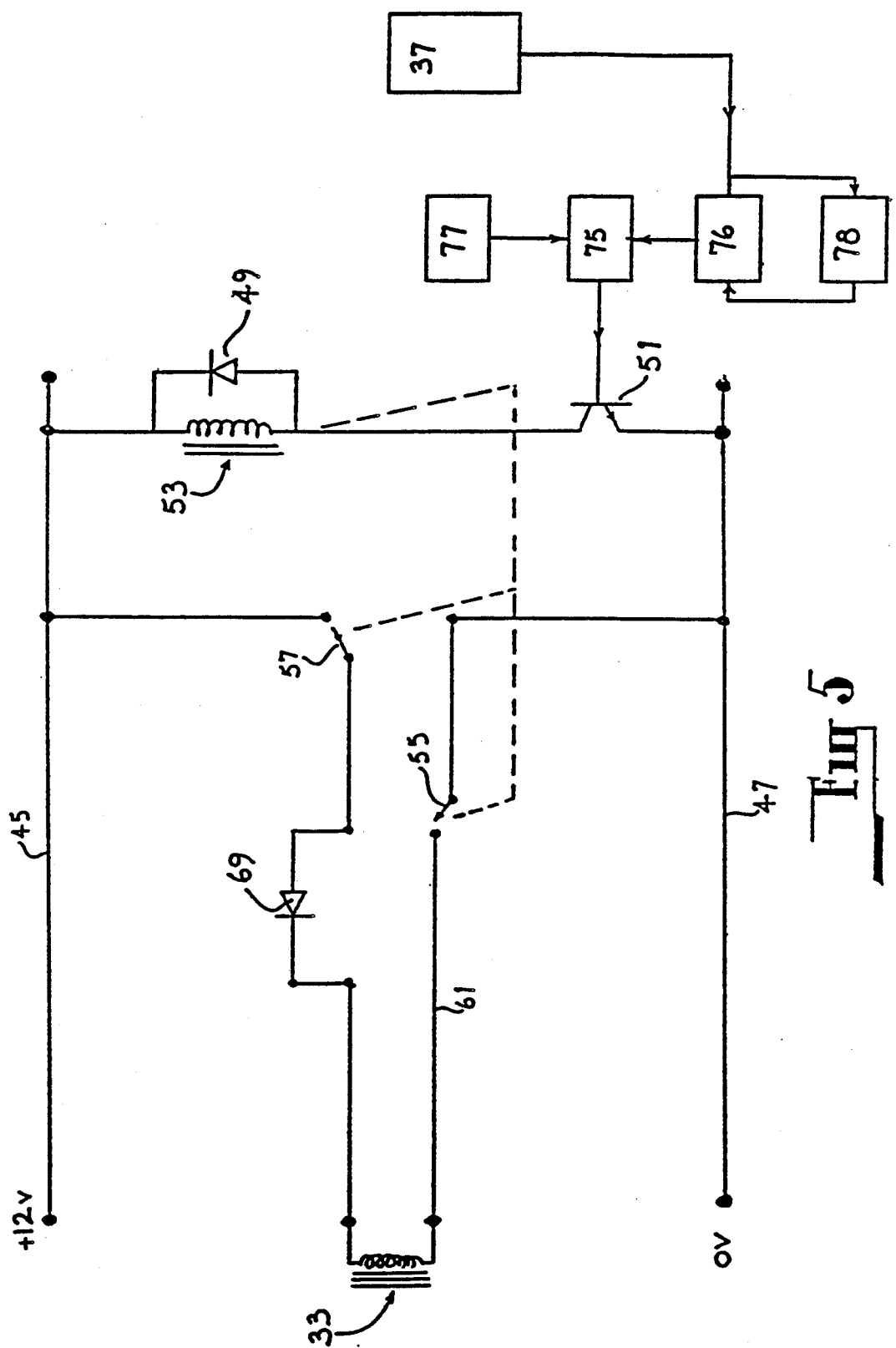

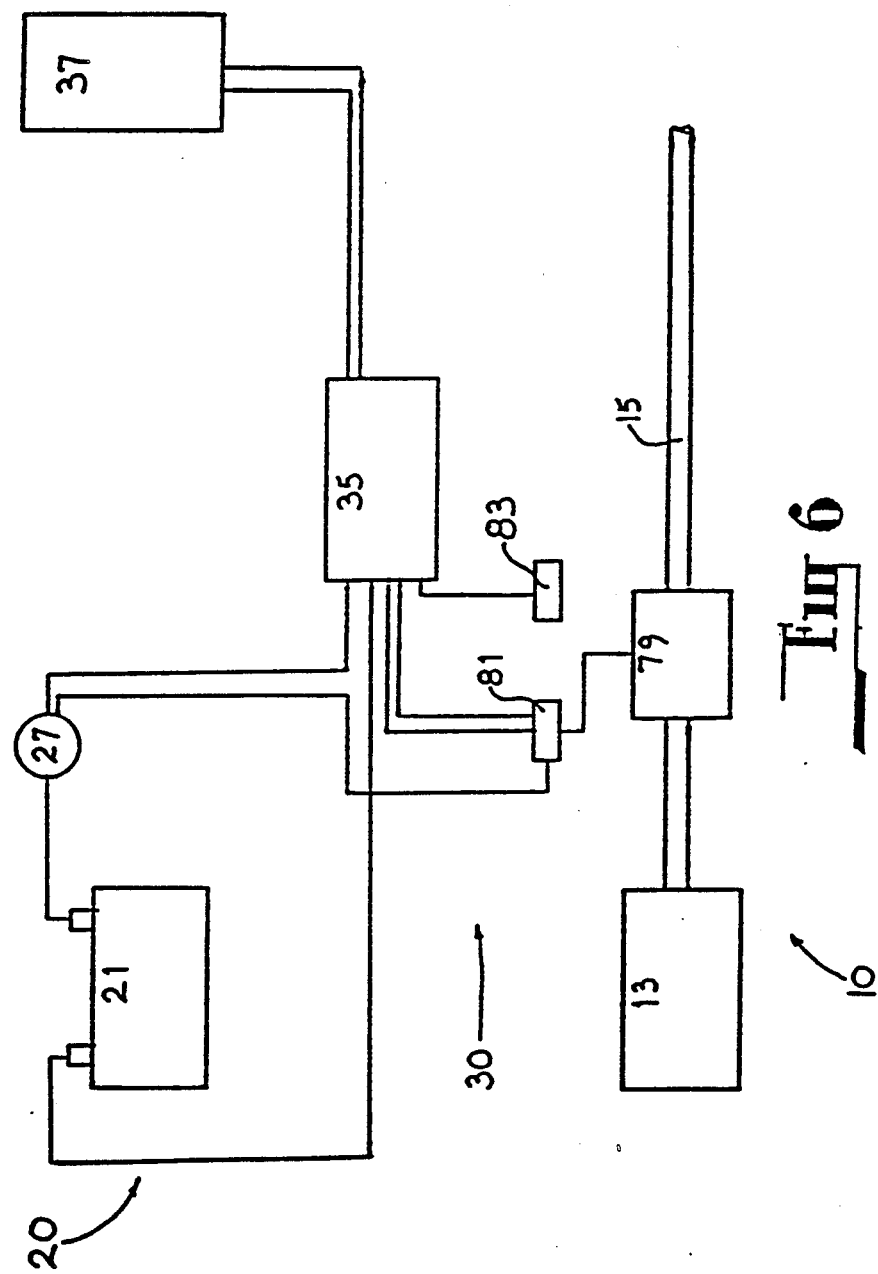

SECURITY SYSTEM FOR AN ENVIRONMENT

THIS INVENTION relates to a security system for an environment.

FIELD OF THE INVENTION

In this specification the term "environment" shall be taken to include buildings, motor vehicles, boats, caravans, safes, and any other article to which a security system would be appropriate.

BACKGROUND OF THE INVENTION

There are many situations where it is desirable to inhibit unauthorised entry to, or unauthorised use of, environments such as buildings and motor vehicles. In the case of motor vehicles, ignition keys provide a basic level of security but they are not entirely satisfactory in that they can be easily circumvented to allow the engine of the vehicle to be started. There are proposals which provide an additional level of security, such proposals incorporating another form of security device in the motor vehicle such as a valve in the fuel supply line or a switch in the electrical wiring controlling the operation of the engine. For convenience, such other security devices are generally controlled by a solenoid or other switching device such as an electronic security alarm system, which can be energised or otherwise operated from a battery in the electrical system of the vehicle. While the presence of such other security devices does afford some additional security protection to the vehicle, it is still possible for the wiring of the control circuitry of such other security devices to be rearranged so as to actuate the solenoid or other switching device thereby to disarm the security system and to allow the engine to be started. Similar considerations apply to electronically controlled security locks for doors in environments such as buildings and safes.

The security devices described above are vulnerable because they operate at voltage levels which are available from the normal power supplies derived in the environment, such as a twelve volt supply typically used in the engine operating control circuit of motor vehicles. This normal power supply can therefore be used to facilitate disarming of the security device.

SUMMARY OF THE INVENTION

The present invention seeks to overcome the disadvantage described above by providing a security system which can only be disarmed using a voltage level which exceeds the voltage level normally derived from the environment in which the security system is installed.

In one form the invention resides in a security system for an environment from which a power supply at a first voltage level is derived, said security system comprising disarming means responsive only to a voltage level exceeding said first voltage level for disarming the security system and means for generating a second voltage level which exceeds said first voltage level and to which said disarming means is responsive.

Preferably, said disarming means comprises a solenoid, said second voltage level constituting an actuating voltage for actuating the solenoid and said first voltage level constitutes a holding voltage for holding the solenoid in an actuated condition upon termination of the second voltage.

Preferably said means for generating the second voltage level comprises a first electrical circuit to be energised by said power supply.

Preferably, said first electrical circuit includes a capacitor which is adapted to store charge while the security system is armed to provide a stored charge at said first voltage level, said capacitor being adapted to selectively deliver said stored charge in series with said first voltage level to provide said second voltage level for disarming the system.

Preferably, said power supply is derived from a second electrical circuit and switch means are provided for energising said first and second electrical circuits. The switch means may comprise a first switch incorporated in the first electrical circuit and a second switch incorporated in the second electrical circuit.

For the purpose of enhancing the level of the security, the first switch may in one arrangement be operable only in response to input of a valid security code into the security system. In this connection the security system may further comprise means for entering a code, memory means for storing particulars of a valid code, means for comparing the code so entered against the particulars of the code in the memory means, and means providing an output signal for actuating said first switch when the entered code is recognised as being valid.

In another form the invention resides in a security system for inhibiting unauthorised operation of an internal combustion engine having an electrical circuit controlling operation of the engine including a power source for energising the electrical circuit, said security system comprising a solenoid the deactuatable to disable the engine and a second electrical circuit for controlling operation of the solenoid, said second electrical circuit being adapted to be energised by said power source and being adapted to apply two voltage levels to the solenoid, one voltage level being an actuating voltage to actuate the solenoid and the other voltage level being a holding voltage to hold the solenoid in the actuated condition, said actuating voltage exceeding the voltage of the power supply.

BRIEF DESCRIPTION OF THE DRAWINGS

The invention will be better understood by reference to the following description of several specific embodiments thereof as shown in the accompanying drawings in which:

FIG. 4 is a schematic view similar to FIG. 3, illustrating only that part of the electrical control circuit which is operational during disarming of the security system;

FIG. 5 is a schematic view which is also similar to

FIG. 3 illustrating only that part of the electrical control circuit which is operational after disarming of the security system so as to permit operation of the engine;

FIG. 6 is a schematic view of a security system according to a second embodiment fitted to an internal combustion engine having a fuel injection system.

DESCRIPTION OF PREFERRED EMBODIMENTS

Figure 1:
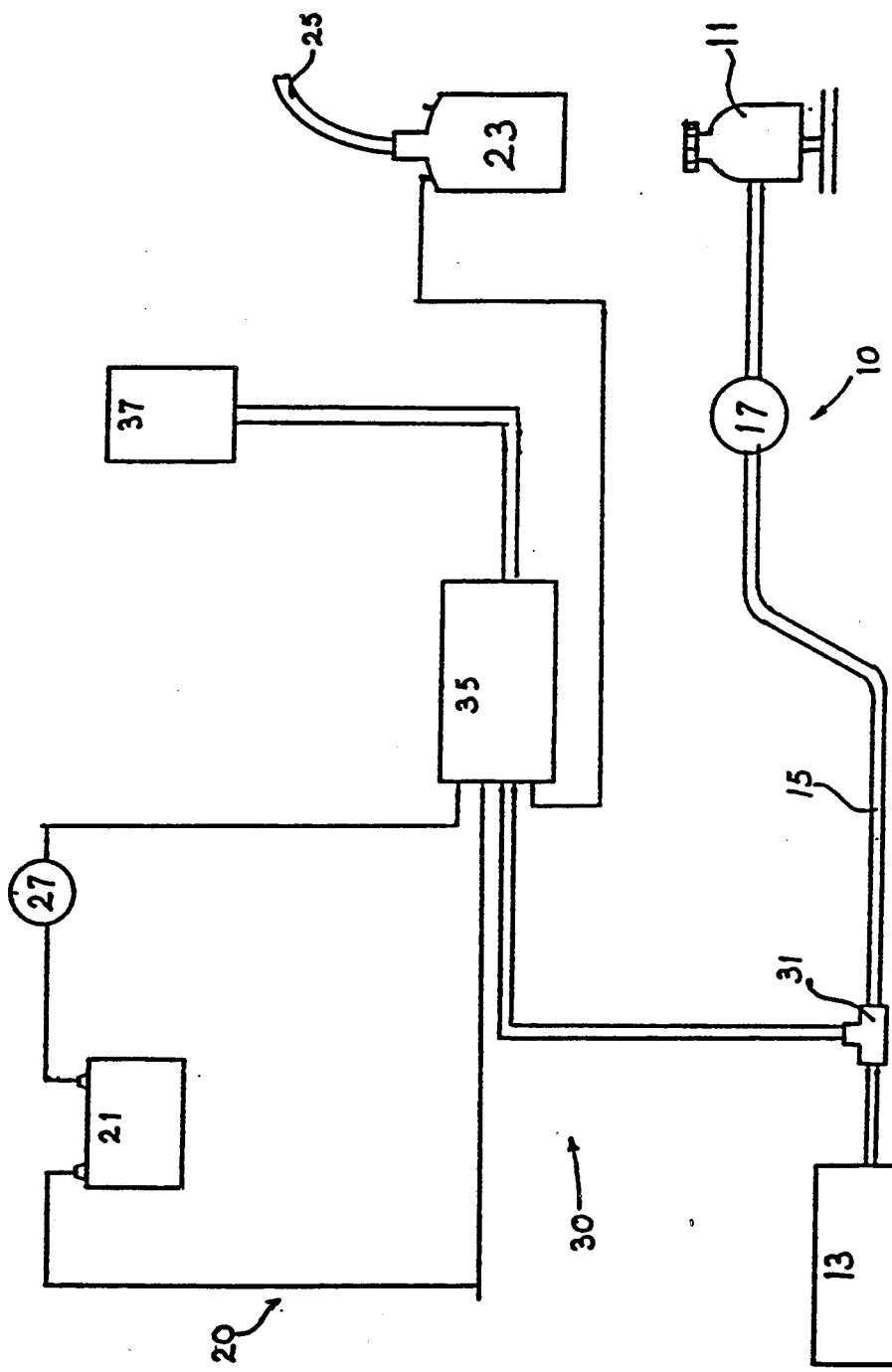
FIG. 1 is a schematic view of a security system according to the first embodiment fitted to an internal combustion engine fitted with a carburetter.

The first embodiment, which is illustrated schematically in FIGS. 1 to 5 of the accompanying drawings, is directed to a security system for a motor vehicle having an internal combustion engine which receives fuel by way of a carburetter system. The security system, when armed, is arranged to block fuel supply to the engine so as to prevent unauthorised use of the motor vehicle. Additionally, the security system is arranged so that it can be disarmed only by use of an ignition key for the engine and insertion of a valid security code into the system.

The engine comprises a fuel supply system 10 which includes a carburetter 11 which receives fuel from a fuel tank 13 by way of a fuel delivery line 15. A fuel pump 17 is included in the fuel delivery line to convey fuel from the fuel tank 13 to the carburetter 11.

The engine further comprises an engine operating control circuit 20 which comprises a power supply including a battery 21 and an alternator (not shown). In this embodiment, the power supply is at a nominal voltage level of 12 volts. The control circuit 20 further comprises an ignition coil 23 having a high tension lead 25 which is connected to a distributor (not shown). The control circuit 20 also comprises an ignition switch 27.

The security system 30 comprises a flow control valve 31 which is installed in the fuel delivery line 15 to selectively open and close the fuel delivery line to fuel flow. The flow valve 31 is opened and closed under the control of a solenoid 33. The security system further comprises a control module 35 for controlling operation of the solenoid 33.

The flow control valve 31 is arranged to assume a normal position in which it blocks fuel flow along the fuel delivery line so as to disable the engine and is adapted to open only when a control signal is received from the control module 35. When the control valve 31 opens, the security system is disarmed and the engine can operate in a normal manner.

The solenoid 33 operates under the control of a control circuit 41 which is incorporated in the control module 35. The control circuit 41 is energised from the power supply 21 of the vehicle by power supply rails derived from the power supply 21, and is adapted to apply two voltage levels to the solenoid 33, one voltage level being an actuating voltage to actuate the solenoid and the other voltage level being a holding voltage to hold the solenoid in the actuated condition. The solenoid characteristics are determined so that the actuating voltage level required to actuate the solenoid exceeds the voltage level of the power supply 21; for example where the engine control system of the vehicle operates at 12 volts as is the case in this embodiment, the actuating voltage level may be in the order of 20 volts. Once the solenoid has been actuated, a lower voltage level is sufficient to maintain it in the actuated condition and a holding voltage level of 12 volts is used for such purpose. It is for the purposes of simplicity of design and convenience that the holding voltage is at a voltage level corresponding to the voltage level of the engine control system, namely 12 volts. In order to provide an actuating voltage which exceeds the voltage level of the power supply 21 of the engine control system it is necessary to boost the voltage available from the power supply and a first electrical circuit including a capacitor 43 is provided in the control circuit 41 for such purpose.

The control circuit 41 includes two voltage rails 45 and 47. Voltage rail 45 is nominally twelve volts positive with respect to voltage rail 47 at such time when the ignition switch 27 is turned on. Voltage rail 45 is connected to the positive supply for the engine control circuit and voltage rail 47 is connected to the chassis of the vehicle, the chassis being at zero volts electromotive potential in this embodiment.

A relay 53 is connected in series with a transistor 51 which is configured as a switch. The emitter of transistor 51 is connected to voltage rail 47, the collector is connected to one terminal of the electric coil of relay 53, the other terminal of the electric coil of relay 53 is connected to voltage rail 45. A diode 49 is connected in parallel with the electric coil of relay 53 in such a manner that it is reverse biased when the relay is operated. In this way the diode is configured as a suppression element.

Figure 2:
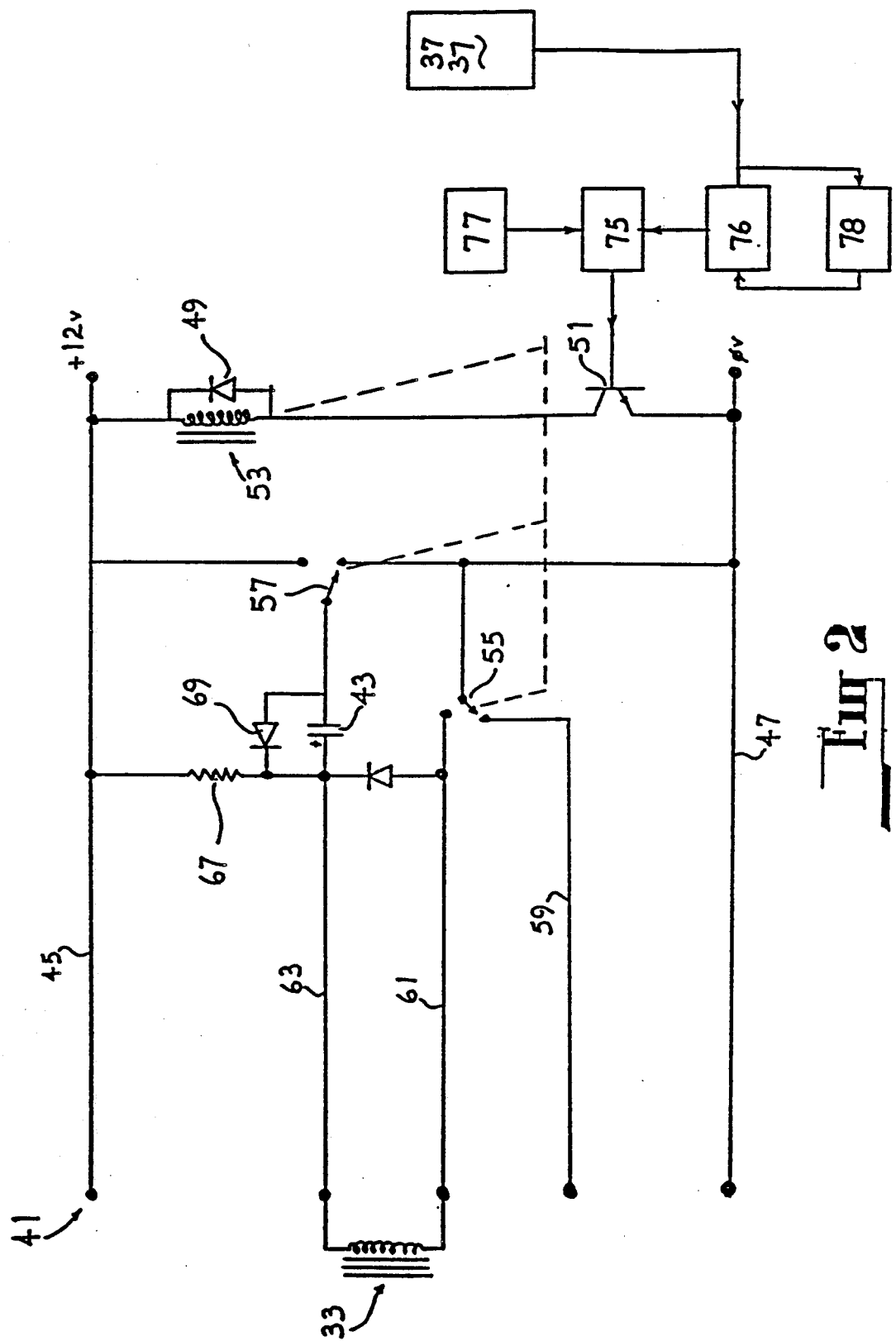
FIG. 2 is a schematic view of part of the security system, showing an electrical control circuit contained within the security system.

The relay 53 operates switches 55 and 57, said switches being shown in FIG. 2 configured in the positions assumed when the relay is not operated. Relay 53 is operated when transistor 51 is turned on with a positive signal to its base with respect to voltage rail 47, supplied by control module 35.

The switches 55 and 57 of relay 53 are connected to a resistor 67, two diodes 65 and 69, two connection terminals 61 and 63, an additional connection terminal 59 and the capacitor 43, as shown in FIG. 2 and connected to voltage rails 45 and 47. The diode 65 is configured as a suppression element, being connected across terminals 61 and 63 such that it is reverse biased with respect to power applied from the voltage rails. The terminals 61 and 63 connect to solenoid 33.

The additional terminal 59 is intended to be connected to the points of a Kettering type ignition system such that the points are connected to voltage rail 47 via switch 55 and additional terminal 59, disabling the ignition system by preventing switching of the ignition coil of the motor vehicle. Diode 69 is connected in parallel with capacitor 43.

Figure 3:
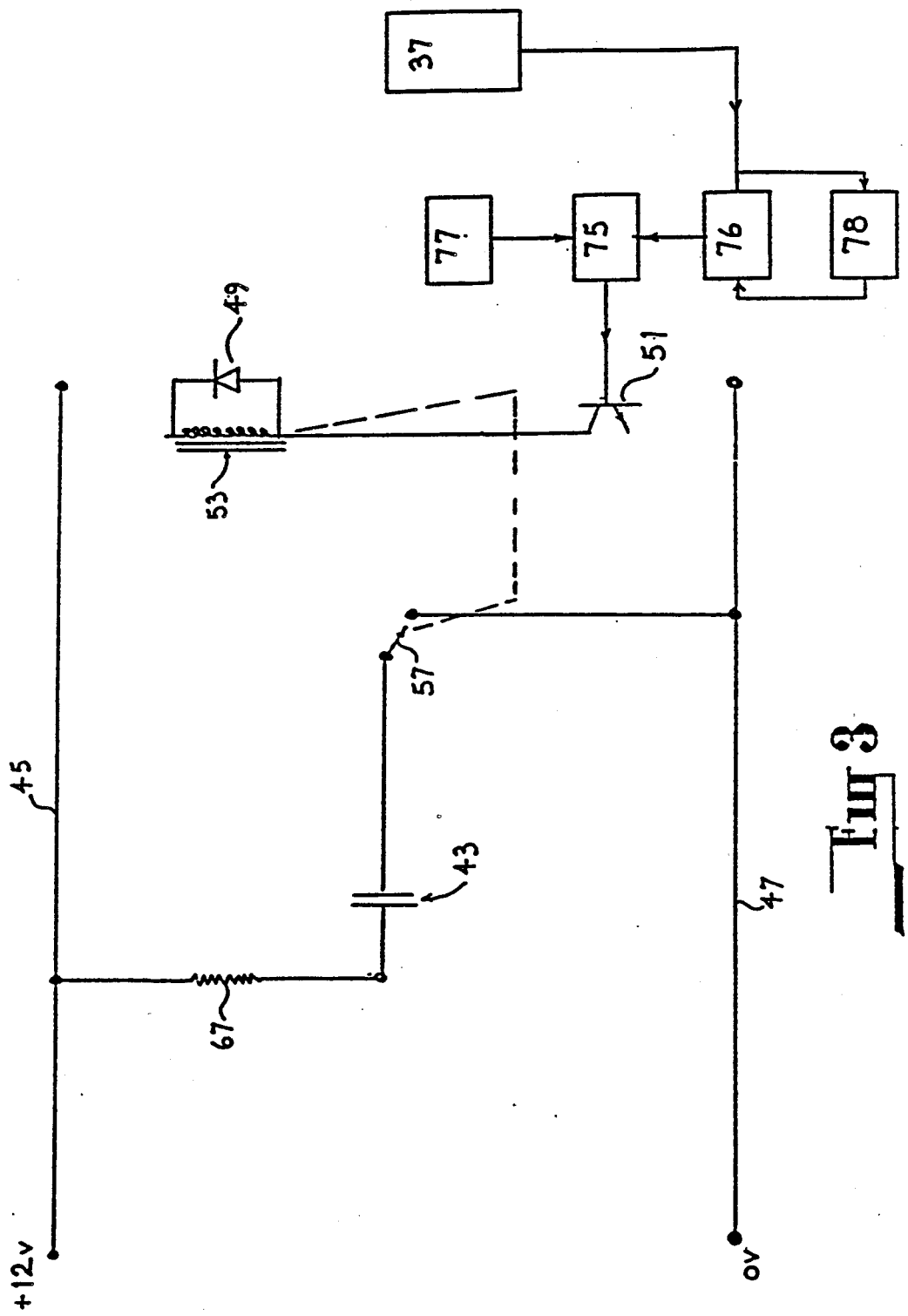
FIG. 3 is a view similar to FIG. 2, illustrating only that part of the electrical control circuit which is operational immediately prior to disarming of the security system.

When the ignition switch is turned on voltage rails 45 and 47 are at a electromotive potential of positive twelve volts and capacitor 43 is charged to this voltage via resistor 67 and switch 57. This current path is shown in FIG. 3.

When relay 53 is operated, switches 55 and 57 are thrown to connect capacitor 43 in series with the voltage rails 45 and 47, and in so doing provide an actuating voltage across terminals 61 and 63 which falls as capacitor 43 discharges, this actuating voltage being high enough for a sufficient period of time to actuate solenoid 33, and being higher than the voltage across voltage rails 45 and 47. The current paths are shown in FIG. 4.

When capacitor 43 is completely discharged the voltage across terminals 61 and 63 to solenoid 33 will be the same as the voltage across voltage rails 45 and 47. Up until this point in time diode 69 is reversed biased. As current continues to flow capacitor 43 will begin to charge in a reverse direction until diode 69 begins to conduct in the forward direction thus preventing excessive reverse charge in capacitor 43 and ensuring supply of voltage to terminals 61 and 63 which is in the order of one forward bias voltage drop across diode 69 less than the voltage across voltage rails 45 and 47. This voltage is sufficient to ensure that solenoid 33 remains held. The current paths are shown in FIG. 5.

Referring again to FIG. 2 it can be seen that when switch 55 is actuated by relay 53, the auxiliary contact is disconnected from voltage rail 47, thus enabling the motor vehicle ignition system to work.

The security system is provided with a further level of security in that the control module 35 is arranged to operate the solenoid which controls the flow control valve 31 only when a valid security code is inserted into a key pad. With this arrangement, an intending user of the vehicle must not only operate the ignition switch 27 but also insert a valid security code into the key pad before the security system is disarmed.

A code entered into the key pad 37 is delivered to a comparator 75 via a de-coder 76. The comparator compares the entered code against a security code stored in a memory 77. If the entered code is found to be valid, the comparator delivers a signal to effect operation of the switch 51. If the entered code is not recognised as being valid, no such signal is delivered. A reaction timer 78 is associated with the key pad and requires a code to be entered within a prescribed time, otherwise the security system will not be disarmed even through the code so entered may be a valid code. The purpose of this is to endeavour to detect persons who are intoxicated or otherwise incapable of driving and prevent them from driving the vehicle.

Referring now to FIG. 6 of the drawings, the second embodiment provides a securing system for a vehicle which does not have a carburetter but rather has a fuel injection system including a high pressure pump 79 in the fuel delivery line 15.

In this embodiment, the security system is arranged to disable the pump 79 and thereby prevent unauthorized use of the vehicle. More particularly, operation of the pump is controlled by relay 81 which operates at a voltage level corresponding to the level of the actuating voltage level of the first embodiment (i.e. at about 20 volts). This provides a measure of security protection in that the relay 81 cannot be actuated to enable operation of the pump 79 simply by applying a voltage level of 12 volts which is available from the engine operating control circuit; the relay can only be operated by using the higher voltage level. A further relay 83, which is also only operable at the higher voltage level, disables the ignition system or other electrical components of the engine and thereby provides an additional level of security.

It should be appreciated that the scope of the invention is not limited to the scope of the embodiments described. In particular, it should be understood that the security system according to the invention may employ solid state electronic switching devices, rather than solenoids and relay switches, to disarm the security system. In such cases, the electronic switching devices would be arranged to operate at the higher voltage levels described.

We claim:

1. A security system for an environment from which power supply rails at a predetermined voltage level are derived to power said security system, said security system being capable of being selected between an armed state and a disarmed state, and comprising means for generating a control signal to disarm said security system and disarming means adapted to select said disarmed state in response solely to said control signal; wherein said control signal comprises a signal having an absolute voltage greater than the voltage of said predetermined voltage level.

2. A security system according to claim 1 wherein said disarming means comprises an electromagnetic coil for a solenoid, said solenoid operable between an unactuated state corresponding to said armed state, and an actuated state corresponding to said unarmed state; wherein said absolute voltage is required to actuate said solenoid to said actuated state, and said predetermined voltage level is sufficient to retain said actuated state.

3. A security system according to claim 2 wherein said means for generating said control system comprises a first electrical circuit adapted to be energised by said power supply rails.

4. A security system according to claim 3 wherein said first electrical circuit includes a capacitor which is adapted to store charge at a voltage commensurate with the voltage of said predetermined voltage level while the security system is in said armed state, said security system being further adapted to selectively deliver said stored charge in series with said predetermined voltage level at said absolute voltage.

5. A security system according to claim 2 wherein said security system is operable from said unarmed state to said armed state by removing said predetermined voltage level from said electromagnetic coil.

6. A security system according to claim 1 wherein said means for generating said control signal comprises a first electrical circuit adapted to be energised by said power supply rails.

7. A security system according to claim 6 wherein said first electrical circuit includes a capacitor which is adapted to store charge at a voltage commensurate with the voltage of said predetermined voltage level while the security systems is in said armed state, said security system being further adapted to selectively deliver said stored charge in series with said predetermined voltage level at said absolute voltage.

8. A security system for inhibiting unauthorized operation of an internal combustion engine having a first electrical circuit controlling operation of the engine including a power source for engerising the electrical circuit, said security system comprising an electromagnetic coil for a solenoid, the solenoid being de-actuatable to arm the security system and, thereby, to disable the engine, and a second electrical circuit for controlling operation of the electromagnetic coil, said second electrical circuit being adapted to be energised by said power source and being adapted to apply two voltage levels to the solenoid, one voltage level being an actuating voltage to actuate the solenoid to enable operation of the engine and the other voltage level being a holding voltage to hold the solenoid in the actuated condition to maintain enabled operation of the engine, wherein said actuating voltage is greater than the voltage of the power supply.

9. A security system according to claim 8 wherein said security system is operable to disable the engine by removing said other voltage level from said electromagnetic coil.

* * * * *